United States Patent [19]
Welch et al.

[11] Patent Number: 5,092,668
[45] Date of Patent: Mar. 3, 1992

[54] EYEGLASS CORD RETAINER APPARATUS

[76] Inventors: Sondra L. Welch; Stephen G. Welch, both of 662 Hoover St., Escondido, Calif. 92027

[21] Appl. No.: 541,315

[22] Filed: Jun. 21, 1990

[51] Int. Cl.$^5$ .............................................. G02C 3/00
[52] U.S. Cl. .................................. 351/156; 351/157; 351/123
[58] Field of Search ........................ 351/156, 157, 123

[56] References Cited

U.S. PATENT DOCUMENTS

| | | | |
|---|---|---|---|
| 3,588,960 | 6/1969 | McClellan et al. | 351/157 |
| 3,874,776 | 4/1975 | Seron | 351/156 |

FOREIGN PATENT DOCUMENTS 2212293  7/1989  United Kingdom ............... 351/157

*Primary Examiner*—Paul M. Dzierzynski
*Attorney, Agent, or Firm*—Leon Gilden

[57] ABSTRACT

An apparatus including an elongate securement cord with a ring formed at each end and each ring mounted to an elastomeric loop. Each elastomeric loop includes a spring member encompassing each elastomeric loop medially thereof to effect an upper and lower loop with the upper loop of each elastomeric loop resiliently securing a temple leg of an eyeglass assembly therewithin.

4 Claims, 5 Drawing Sheets

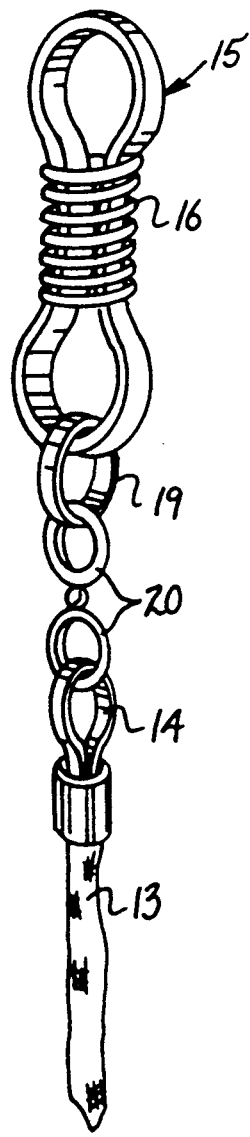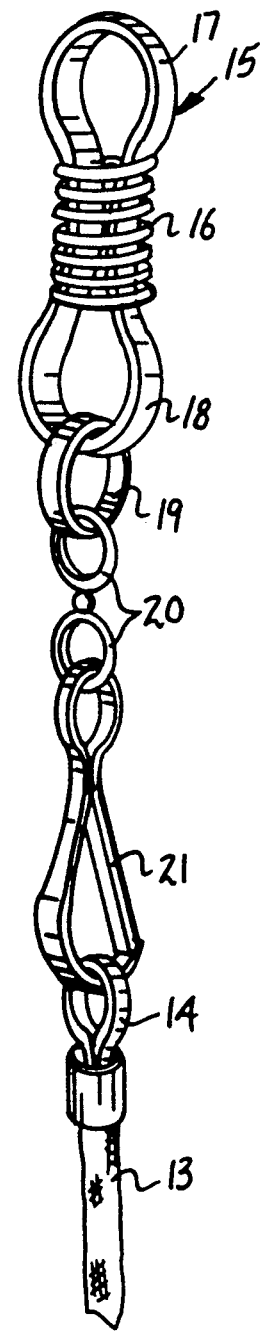

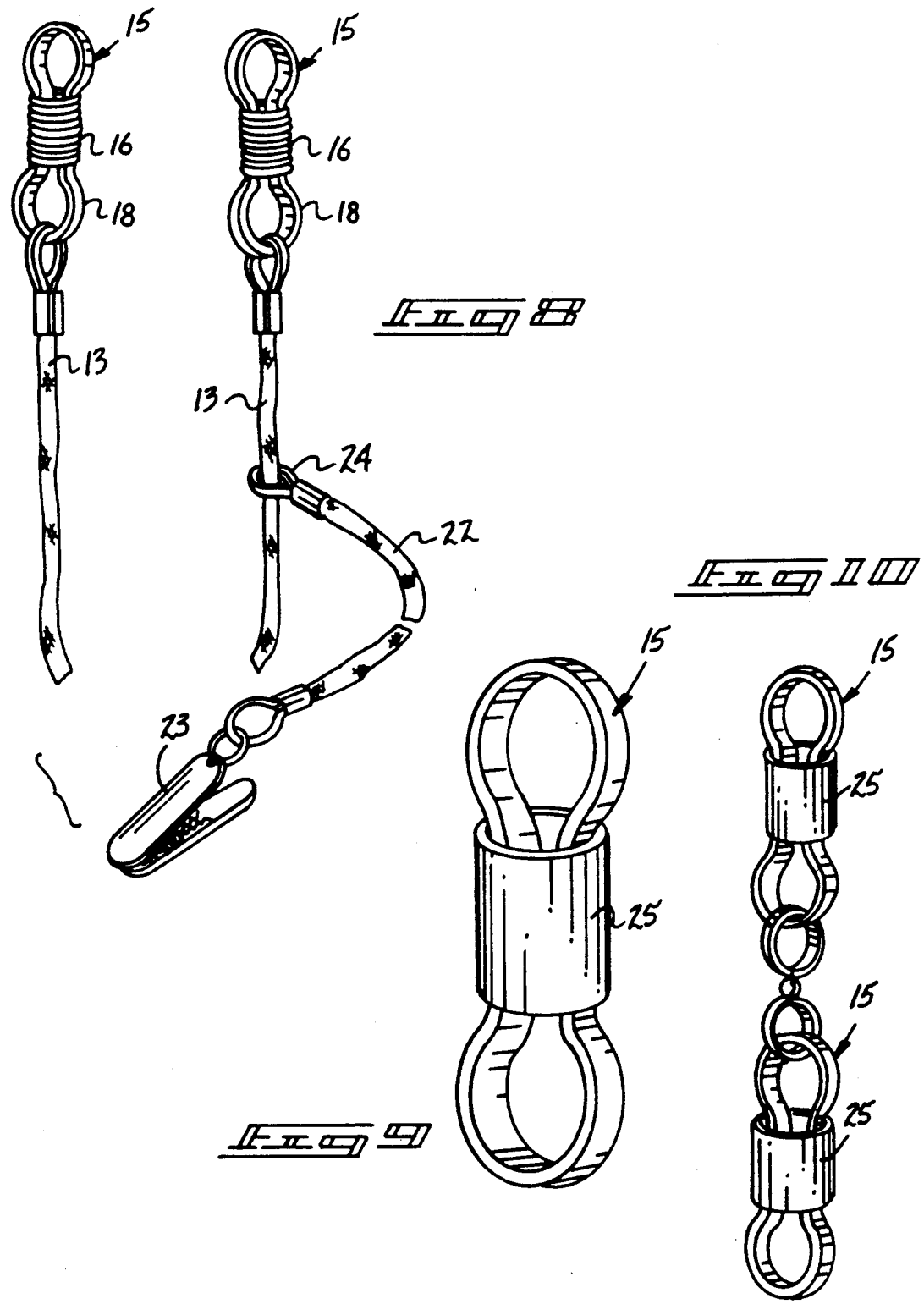

EYEGLASS CORD RETAINER APPARATUS

BACKGROUND OF THE INVENTION

1. Field of the Invention

The field of the invention relates to eyeglass retainer apparatus, and more particularly pertains to a new and improved eyeglass cord retainer apparatus to resiliently secure an eyeglass temple leg relative to a securement cord of an eyeglass retainer assembly.

2. Description of the Prior Art

Eyeglass retainer cords are known and utilized in the prior art. Conventionally, a ring is formed at each end of the cord to mount loop members that in turn may include a securement ring thereabout to retain an eyeglass temple leg. The ring members when available are of a generally rigid configuration and during passage of time the loop even when formed of resilient material losses its elasticity and permits slippage of an eyeglass temple leg therethrough. The instant invention attempts to overcome dificiencies of the prior art by in leiu of a conventional ring member utilizing an elongate spring encompassing the loop to resiliently bias and secure each temple leg within each loop. Examples of prior art structure may be found in U.S. Pat. No. 3,979,795 to SERON wherein a typical example of a resilient loop mounting a rigid ring thereabout secures each temple leg of an eyeglass assembly within an associated loop.

U.S. Pat. No. 4,541,696 to WINGER utilizes an eyeglass retainer formed of a tubular elastomeric member to retain the temple legs relative to the tubular member.

U.S. Pat. No. 4,603,951 to BECK et al utilizes a spacable frame with elastomeric band mounted within apertures formed through each remote terminal end of each temple leg of an eyeglass assembly.

U.S. Pat. No. 4,790,646 to SERON sets forth an elastomeric strap mounting a loop at each end thereof.

U.S. Pat. No. 4,743,105 to TABACCHI sets forth an organization for securing each temple leg of an eyeglass assembly formed of a semi-tubular sleeve to encompass and secure each temple leg within each sleeve.

As such, it may be appreciated that there continues to be a need for a new and improved eyeglass cord retainer apparatus as set forth by the instant invention which addresses both the problems of ease of use as well as effectivenes in construction in frictionally retaining spaced temple legs of an eyeglass assembly therewithin and in this respect, the present invention substantially fulfills this need.

SUMMARY OF THE INVENTION

In view of the foregoing disadvantages inherent in the known types of eyeglass retainer apparatus present in the prior art, the present invention provides a new and improved eyeglass cord retainer apparatus wherein the same utilizes elastomeric bands and a coil spring surroundingly mounted about each band to resiliently engage and secure respective temple legs of an eyeglass assembly to the invention. As such, the general purpose of the present invention, which will be described subsequently in greater detail, is to provide a new and improved eyeglass cord retainer apparatus which has all the advantages of the prior art eyeglass retainer apparatus and none of the disadvantages.

To attain this, the eyeglass cord retainer apparatus of the invention includes an apparatus including an elongate securement cord with a ring formed at each end and each ring mounted to an elastomeric loop. Each elastomeric loop includes a spring member encompassing each elastomeric loop medially thereof to effect an upper and lower loop with the upper loop of each elastomeric loop resiliently securing a temple leg of an eyeglass assembly therewithin.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved eyeglass cord retainer apparatus which has all the advantages of the prior art eyeglass cord retainer apparatus and none of the disadvantages.

It is another object of the present invention to provide a new and improved eyeglass cord retainer apparatus which may be easily and efficiently manufactured and marketed.

It is a further object of the present invention to provide a new and improved eyeglass cord retainer apparatus which is of a durable and reliable construction.

An even further object of the present invention is to provide a new and improved eyeglass cord retainer apparatus which is susceptible of a low cost of manufacture with regard to both materials and labor, and which accordingly is then susceptible of low prices of sale to the consuming public, thereby making such eyeglass cord retainer apparatus economically available to the buying public.

Still yet another object of the present invention is to provide a new and improved eyeglass cord retainer apparatus which provides in the apparatuses and methods of the prior art some of the advantages thereof, while simultaneously overcoming some of the disadvantages normally associated therewith.

Still another object of the present invention is to provide a new and improved eyeglass cord retainer apparatus which may be compactly stored when not being utilized.

Yet another object of the present invention is to provide a new and improved eyeglass cord retainer apparatus wherein the same utilizes elongate compressible spring members mounted about respective elastomeric loops to secure and engage temple leg of an eyeglass assembly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is an isometric illustration of the loop structure mounted to the cord association of the instant invention.

FIG. 7 is an isometric example of the loop structure mounted to the cord organization further utilized by the instant invention.

FIG. 8 is an isometric illustration setting forth the loop structure and cord organization mounted to a retainer clip.

FIG. 9 is an isometric illustration of a modified loop structure of the instant invention.

FIG. 10 is an isometric illustration of the modified loop structure and cord organization mounted to one another.

DESCRIPTION OF THE PREFERRED EMBODIMENT

Figure 1:
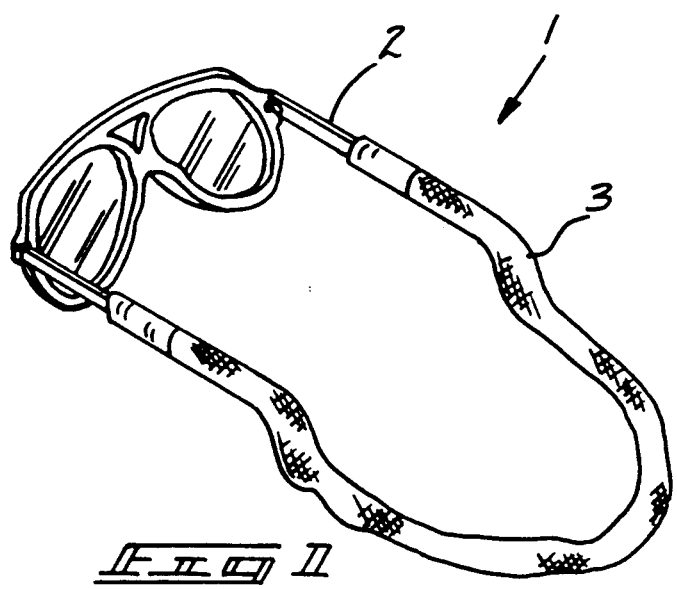
FIG. 1 is an isometric illustration of a prior art eyeglass cord retainer apparatus.

With reference now to the drawings, and in particular to FIGS. 1 to 10 thereof, a new and improved eyeglass cord retainer apparatus embodying the principles and concepts of the present invention and generally designated by the reference numeral 10 will be described.

Figure 2:
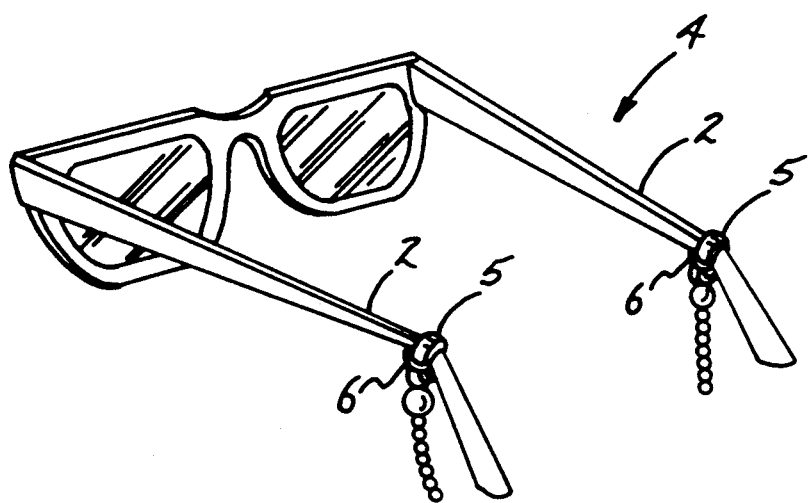
FIG. 2 is an isometric illustration of a further prior art eyeglass cord retainer apparatus.

FIG. 1 illustrates a prior art eyeglass cord retainer apparatus 1 wherein an eyeglass organization includes spaced temple legs 2 with a tubular sheath 3 initially encompassing each temple leg to secure each temple leg to the sheath. FIG. 2 illustrates a further prior art eyeglass retainer apparatus 4 wherein the spaced temple legs 2 each mount a resilient loop 5 with an encompassing ring 6 to secure each loop to each temple leg.

Figure 3:
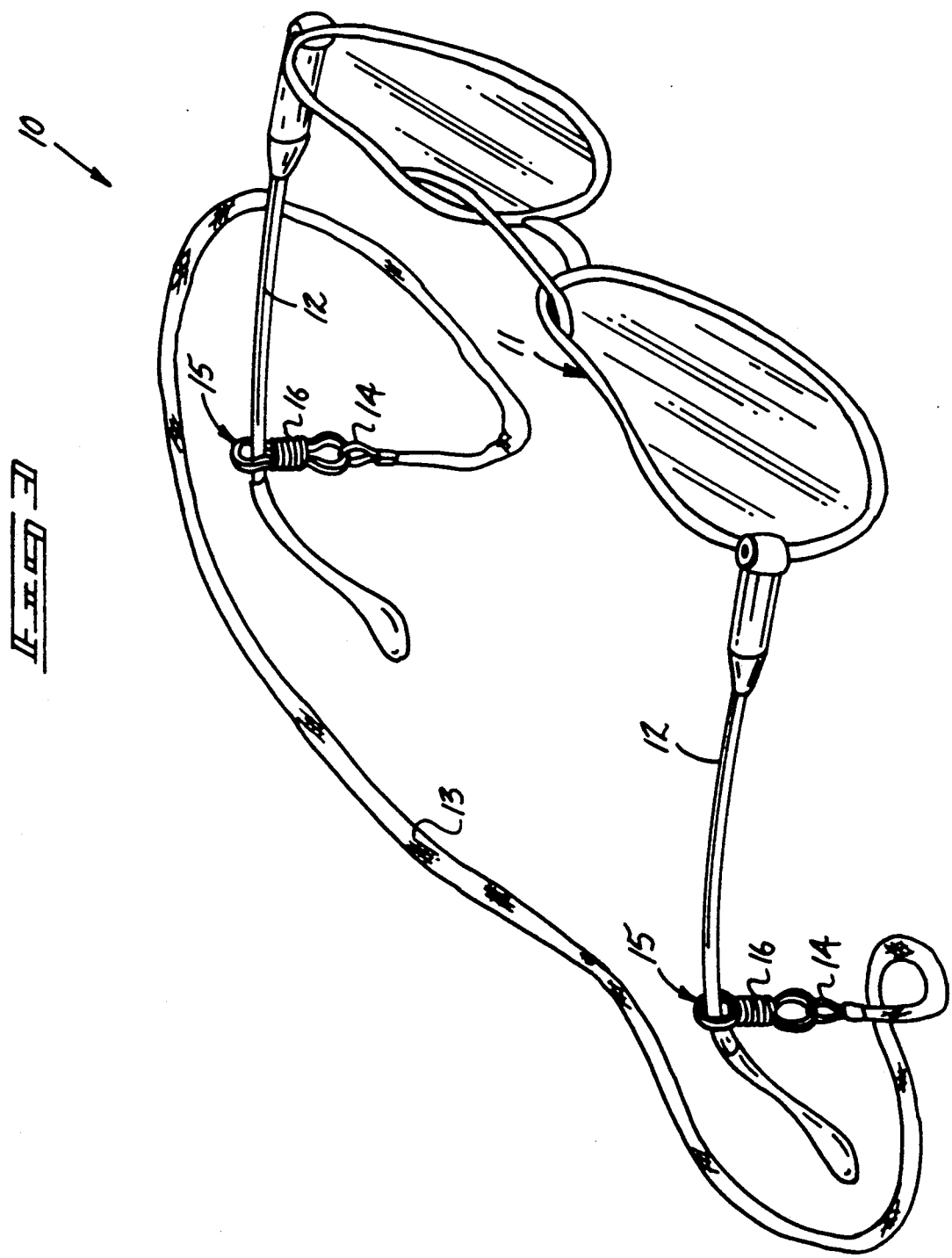
FIG. 3 is an isometric illustration of the instant invention.
Figure 4:
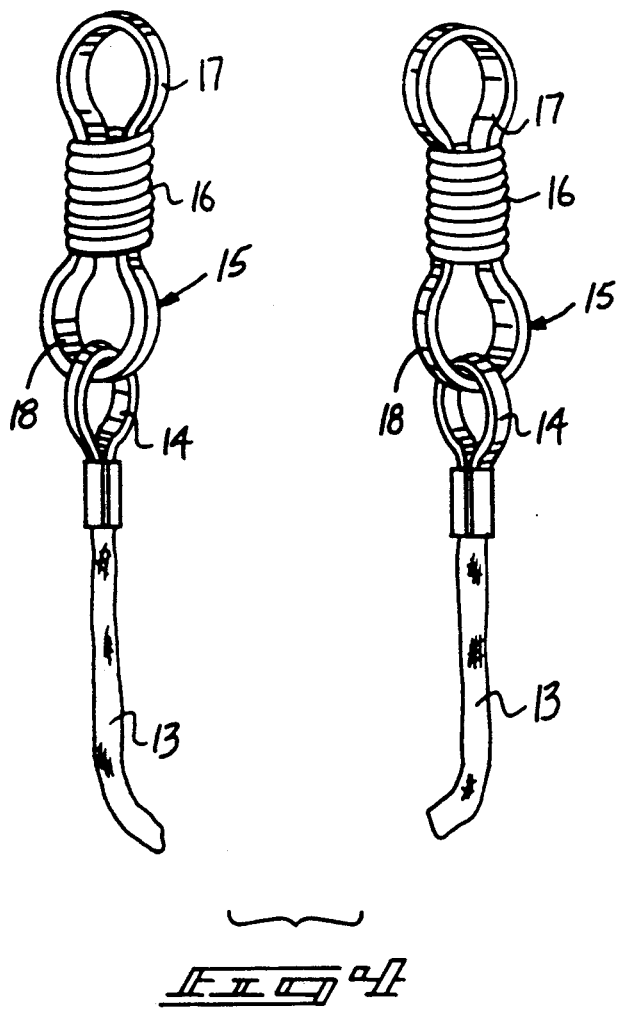
FIG. 4 is an orthographic view of the loop structure utilized by the instant invention.
Figure 5:
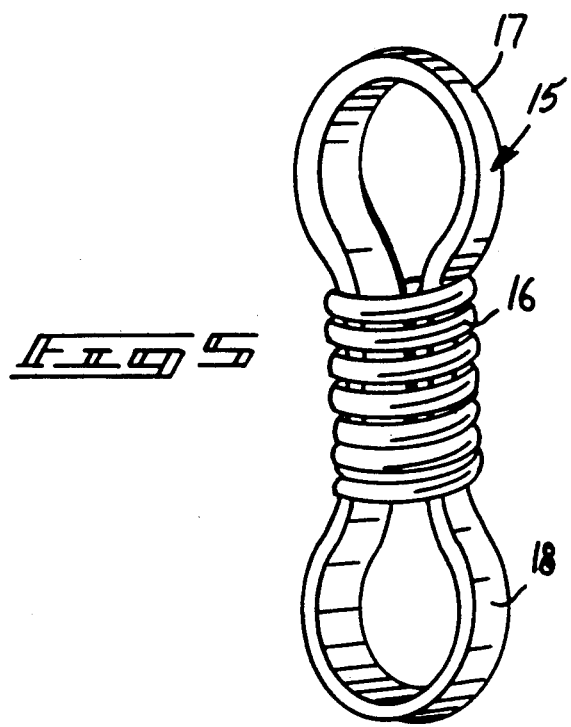
FIG. 5 is an isometric illustration of the loop structure of the instant invention.

More specifically, the eyeglass cord retainer apparatus 10 of the instant invention essentially comprises, an eyeglass assembly 11 defining a framework mounting a plurality of temple legs 12 at each side of the framework wherein the temple legs extend rearwardly in an open configuration as illustrated in FIG. 3 to receive the retainer apparatus of the instant invention. An elongate securement cord 13 is provided wherein the securement cord includes a securement cord end ring 14 mounted at each terminal end of the securement cord. An elastomeric support loop 15 is directed through each end ring 14 with an elongate wound coil spring clasp 16 mounted about each support loop 15 to define a figure eight configuration by each support loop. Each support loop 15 accordingly defines an upper loop 17 to receive and resiliently engage in surrounding relationship a temple leg 12 with a lower loop 18 of each support loop secured to each end ring 14. FIG. 6 illustrates the use of a support ring 19 mounted to the lower loop 18 with pivot rings 20 securable to the support ring that in turn are mounted to the end ring 14 to enhance a pivotal inter-relationship between the end ring 14 and the support loop 15. FIG. 7 further utilizes a spring clasp 21 mounted to a lower pivot ring of the pivot rings 20 that is selectively securable to the end ring 14 of the securement cord 13.

Reference to FIG. 8 illustrates the optional use of a tether line 22 with the tether line 22 including a tether line loop 24 slidingly receiving the securement cord 13 therethrough with a clasp 23 formed with spring bias jaws mounted at a remote terminal end of the tether line 22 to permit securement of the tether line 22 and the associated securement cord 13 to a garment of clothing to minimize potential loss of an associated eyeglass assembly.

FIG. 9 illustrates the use of an elongate resilient tubular sleeve 25 utilized in lieu of the elongate helically wound coil spring 16.

It should be noted, that the coil spring 16 may be compressed to provide additional clearance through the upper loop 17 to receive a temple leg 17 therethrough where upon release of the spring 16 effects extension of the spring 16 and associated resilient and surrounding engagement of each temple leg 12.

As to the manner of usage and operation of the instant invention, the same should be apparent from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An eyeglass cord retainer apparatus for use with an eyeglass assembly wherein the eyeglass assembly includes a central frame and the central frame pivotally mounts a temple leg at each side of the frame wherein each temple leg extends rearwardly of the frame and wherein the apparatus comprises, an elongate flexible securement cord, the securement cord including spaced terminal ends, each terminal end including an end ring formed to each terminal end, and each end ring mounted to a respective elastomeric support loop, each elastomeric support loop including a spring member mounted about each support loop to define a figure eight configuration within each support loop and wherein the figure eight configuration of each support loop defines an upper loop and a lower loop, each upper loop of each support loop arranged for frictional surrounding engagement with a respective temple leg, and each lower loop of each respective support loop secured to each end ring, and wherein each spring member defines an elongate helically wound and longitudinally compressible coil spring wherein the coil spring is mounted about a major medial surface of each support loop to define the figure eight configuration of each support loop.

2. An apparatus as set forth in claim 1 wherein each lower loop includes a support ring mounted thereabout, and each support ring includes a pivot ring member mounted thereto and wherein each pivot ring is mounted to each end ring to provide pivotment of each support loop relative to each end ring.

3. An apparatus as set forth in claim 2 including a tether line, the tether line including a tether line loop mounted to a first terminal end of the tether line wherein the tether line ring slidable receives the securement cord therethrough, and a second terminal end of the tether line remote from the tether line loop includes a clasp member wherein the clasp member includes spring biased jaws to permit securement of the clasp member to an associated garment of clothing of an individual.

4. An apparatus as set forth in claim 3 further including a spring clasp mounted between each end ring and each pivot ring to permit selective securement and disassembly of each end ring relative to each pivot ring.

* * * * *